(12) United States Patent
Harrison

(10) Patent No.: US 11,794,294 B2
(45) Date of Patent: Oct. 24, 2023

(54) FABRICATION FIXTURE

(71) Applicant: BAE SYSTEMS plc, London (GB)

(72) Inventor: Kirk John Harrison, Barrow-in-Furness (GB)

(73) Assignee: BAE SYSTEMS plc, London (GB)

(*) Notice: Subject to any disclaimer, the term of this patent is extended or adjusted under 35 U.S.C. 154(b) by 52 days.

(21) Appl. No.: 17/627,407

(22) PCT Filed: Jul. 9, 2020

(86) PCT No.: PCT/GB2020/051656
§ 371 (c)(1),
(2) Date: Jan. 14, 2022

(87) PCT Pub. No.: WO2021/009485
PCT Pub. Date: Jan. 21, 2021

(65) Prior Publication Data
US 2022/0250198 A1     Aug. 11, 2022

(30) Foreign Application Priority Data

Jul. 15, 2019 (GB) .................................. 1910119

(51) Int. Cl.
*B23Q 1/03* (2006.01)
(52) U.S. Cl.
CPC .................................... *B23Q 1/035* (2013.01)
(58) Field of Classification Search
CPC ........... B25B 11/00; B23Q 1/03; B23Q 1/035; B23Q 1/037; B66F 9/12
USPC ........ 269/54.5, 265, 266, 269, 302.1, 289 R, 269/900
See application file for complete search history.

(56) References Cited

U.S. PATENT DOCUMENTS

| 4,623,083 A * | 11/1986 | Pagano ................ B27M 3/0073 227/154 |
| 5,407,185 A | 4/1995 | Zehnpfenning et al. |
| 5,690,323 A | 11/1997 | Puttmer et al. |

(Continued)

FOREIGN PATENT DOCUMENTS

| CN | 103934713 A | 7/2014 |
| CN | 107971678 A | 5/2018 |
| DE | 4124340 A1 | 1/1993 |

(Continued)

OTHER PUBLICATIONS

KR 20130081907—Machine Translation (Year: 2012).*

(Continued)

*Primary Examiner* — Lee D Wilson
*Assistant Examiner* — Alberto Saenz
(74) *Attorney, Agent, or Firm* — Finch & Maloney PLLC

(57) ABSTRACT

A fabrication fixture suitable for retaining a workpiece. The fabrication fixture includes a first housing having a plurality of reversibly connected modular subsections and a plurality of independently adjustable supports. A second housing has a plurality of reversibly connected modular subsections and a plurality of independently adjustable supports. In use, the first and second housings at least in part envelop the workpiece such that the independently adjustable supports retain the workpiece within the first and second housings, so as to allow the retained workpiece to be moved. A method of moving a workpiece is also disclosed.

16 Claims, 4 Drawing Sheets

(56) References Cited

U.S. PATENT DOCUMENTS

| | | | | |
|---|---|---|---|---|
| 9,296,092 B2 * | 3/2016 | Jin | ........................ | B25B 11/00 |
| 2019/0314942 A1 * | 10/2019 | Lin | ...................... | B23Q 3/063 |

FOREIGN PATENT DOCUMENTS

| | | | |
|---|---|---|---|
| DE | 19702848 C1 | | 2/1998 |
| DE | 19961901 A1 | | 7/2001 |
| DE | 10026829 A1 | | 12/2001 |
| DE | 202013102380 U1 | | 9/2014 |
| EP | 0739672 A2 | | 10/1996 |
| EP | 0899061 A2 | | 3/1999 |
| GB | 2459878 A | | 11/2009 |
| KR | 20130081907 A | * | 1/2012 |
| WO | 2021009485 A1 | | 1/2021 |

OTHER PUBLICATIONS

International Search Report and Written Opinion received for PCT Application No. PCT/GB2020/051656. dated Oct. 14, 2020. 13 pages.
GB Search Report under Section 17(5) received for GB Application No. 1910119.5, dated Jan. 15, 2020. 4 pages.
International Preliminary Report on Patentability received for PCT Application No. PCT/GB2020/051656. dated Jan. 27, 2022. 8 pages.

* cited by examiner

FABRICATION FIXTURE

The present invention relates generally to a fabrication fixture, a workpiece which is two or more partially fabricated or bonded substrates and a related method of moving said workpiece.

Fabrication fixtures, also sometimes referred to as jigs, are often used to control the positional location of a workpiece in relation to a fixed reference point, tool or another further workpiece. The primary purpose of a fabrication fixture is to maintain geometric stability of a workpiece by removing, or at least severely mitigating, movement in some or all degrees of freedom. This may be achieved by geometric guide features, for example pins or conformal fixture surfaces and/or clamping arrangements which hold the workpiece in a fixed orientation.

For large dimensioned and/or heavy partially welded workpieces it is current practice to use strengthening beams which are temporarily welded across the length and width of the partially welded substrates to counteract shear forces on the partial weld. It will be appreciated that this is a costly and time consuming manufacturing process which further requires the temporary beams to be removed and workpiece surfaces to be ground down to remove any weld remnants left from the use of the temporary beams. Further costs are incurred from time consuming analysis work to ensure partially welded workpieces can be moved safely.

Larger workpieces weighing hundreds of kilogrammes through to tonnes that are required to be flipped, rotated or transposed may begin to deform under their own weight and cannot be moved by manpower alone. Partially welded workpieces of this magnitude are particularly prone to failure due to the immense stresses developed within the workpiece when moved.

It is an example aim of the present invention to at least partially solve or avoid one or more problems or disadvantages with moving partially welded workpieces, whether identified herein or elsewhere, or to at least provide a viable alternative to existing devices or methods of moving said structures.

According to a first aspect of the present invention, there is provided a fabrication fixture suitable for retaining a workpiece comprising; a first housing, a second housing, wherein each of said first and/or second housing comprises; an independently adjustable support, wherein the first and second housing substantially envelop said workpiece such that the independent adjustable support retains the workpiece within the first and second housing, so as to allow the workpiece to be moved.

A workpiece may take a variety of forms, such as, for example, it may include two or more substrates, or a plurality of substrates to be joined in permanent connection. The connection between said substrates, may be achieved by bonding, such as for example, welding, adhesive, mechanical fastening or indeed any known fastening process which may allow a joint to be formed between said two or more substrates to form the workpiece.

Preferably the bonding may be welding such as for example, Flux Cored Arc welding, Submerged Arc welding, Tungsten Inert Gas welding, Manual Metal Arc welding, TIG, TIP TIG & Plasma welding.

The workpiece may be any material, such as, for example polymers, metal, metal alloys and composites. The process is particularly useful for large and/or heavy and/or thick workpieces, particularly metal/metal alloy workpieces. The workpiece may comprise of a plurality of substantially planar metal substrates to be welded at their respective edges, both from a first side and a second side, to create one large planar metallic workpiece. The workpiece may possess a large surface area which is elongate will bow under its own weight due to a lack of flexural and axial stiffness, and so may be particularly prone to shear stress failure at the joining seam especially when in a partially welded state. The shear stress failure at the joining seam is particularly prone to occur where a weld is unable to penetrate the full thickness of the substrates when applied from only one side, i.e. a first side, of the substrate due to the thickness of the substrate and/or the spatial access to the joint due to substrate geometry and/or the welding power available. The partially welded workpiece may then be moved to allow access to the second side of the workpiece, to allow the weld to be fully completed.

The first and second housing may be any shape or configuration, such as, for example cuboid, cylindrical, spherical or may be contoured to match the geometry of the workpiece and may be scaled up to allow manoeuvre of large dimensioned and/or high mass, (multiple tonnes), workpieces. The first and second housing may be made of any material capable of load bearing such as for example, metals, metal alloys, composites, polymers or wood, preferably metal or metal alloys, more preferably steel The first and second housings may take the same form as each other i.e. shape or configuration, or they may take independently selected shapes or configurations, for example, the first housing may only partially cover the footprint of a second housing or vice versa, enough to retain the workpiece between said first and second housings.

In a preferred arrangement, the first and second housing may be of a similar size, and preferably may be an open-box 'sandpit' shaped, such that it may comprise a base and plurality of upstanding walls, to enable both a reversible connection between the first and second housing via the upstanding walls on the first and second housings and further to allow the workpiece to be fully retained, that is enveloped, and housed within the upstanding wall and base of both the first and second housing.

The first and/or second housing may be reinforced by members to prevent unwanted deformation during movement. Said members may comprise strengthening beams spanning the inner and/or outer surface of the first and/or second housing or machined pockets to create a lattice structure or a cantilever frame network which reinforces the first and/or second housing. The reinforcement may be on the base or upstanding walls.

The first and/or second housing may comprise a plurality of modular sub-sections to allow a customisable housing, which is adaptable to different shapes and sizes of workpieces; the housing may be taken apart after use to reveal the sub-sections, which may allow ease of storage. For ease of assembly, said modular sub-sections may be locked together by a reversible connection in similar arrangements to that of the first and second housing, defined hereinafter.

In a highly preferable arrangement, the second housing may be substantially flat on an underside base section to allow the fabrication fixture to be seated on a level surface.

The reversible connection, between first and second housings, and/or sub-sections, may comprise a threaded connector, such as, for example a nut and bolt, clamp, co-locating lug and voids, electromagnet or any other such arrangement which temporarily fastens the first and second housing and/or sub-sections together in reversible and locked engagement.

In a preferred arrangement, the reversible connection may take the form of a threaded bolt connection at defined intervals around the circumference of the first and second housing.

In a highly preferably arrangement the first and second housings are both made from steel, this may support the weight of the workpiece and may mitigate deformation of said workpiece.

In one arrangement both the modular sub-sections and the first and second housings may be held in locked engagement by a nut and bolt arrangement.

In order to retain the workpiece substantially between the first and second housings, there may be a plurality of independently adjustable supports on both the first and second housings. Said independently adjustable supports protrude from the surface of, and may extend through, the first and/or second housing to the workpiece in order to substantially eliminate movement in one or more degrees of freedom. The independently adjustable supports may allow the support of the partially bonded workpiece, to prevent the substrates that have been partially welded to form said workpiece from breaking at the partial weld seam.

The independently adjustable supports may be in permanent or temporary connection with said housing. A permanent connection may include the independently adjustable support being bonded, welded or permanently fastened to said housing. A temporary connection may include the independently adjustable support being mechanically fastened by a threaded connector such as a nut and bolt arrangement extending onto or through said housing or retained by a locking-off mechanism or by utilising geometry features of said housing by way of a twist lock, bayonet fitting or similar mechanism.

The independently adjustable supports may be of fixed length or preferably, extend/retract from the first and/or second housing in order to abut and thereby support the periphery of the workpiece. An extendable independently adjustable support may take the form of a telescopic mechanism, a threaded bolt mechanism or any other mechanism which allows the independently adjustable support to extend or retract its length relative to the first and/or second housing. The independently adjustable supports may be adjusted to length by hand with or without the aid of tools through direct physical manipulation and locked off by a suitable mechanical arrangement.

The independently adjustable supports may be made of any material which withstands the weight, forces and moments induced from a workpiece within a housing before flipping, rotating or transposing the fabrication fixture.

In a preferred arrangement, the independently adjustable support comprises a threaded steel bar in temporary connection with a housing extending through said housing and a captive nut such that threaded steel bar can be extended and retracted to and from the workpiece and wherein the independently adjustable support is locked off, such as, for example by a double nut configuration.

The use of a plurality of independently adjustable supports allows for the fabrication fixture to be rapidly configured to a variety of workpiece geometries and may significantly decrease the time required to change between workpieces. This may be especially useful where said workpieces share no geometric commonality, for example, panels of a technology demonstrator vehicle or panels of a one-off bespoke vessel or craft. The use of a plurality of independently adjustable supports represents a significant departure from current custom and practice where workpieces are simply retained by welding supports directly to a workpiece.

The welding of a plurality of welding supports in the prior art is a time consuming process which requires the cutting of supports to length and welding; further after any manoeuvre of the workpiece, the welded supports need to be removed and the surface of the workpiece "dressed" that is all remnants of the welded supports need to be removed from the workpiece at the end of the process.

The independently adjustable support may comprise a self-levelling foot located substantially on the end of the independently adjustable support that abuts the workpiece; said self-levelling foot may be able to adapt to the contours of a workpiece. The self-levelling foot may comprise a ball and socket joint, a double hinge, a universal joint or indeed any such arrangement that allows the self-levelling foot to move in one or more degrees of freedom to self-level and thereby conform to the surface of the workpiece.

The self-levelling foot may have a textured surface, such as, for example a ridged or knurled surface texture to prevent slippage when engaged and abutted to the workpiece. In an alternative arrangement, the foot may have a resilient member or layer deposed on the foot, such as, for example an intermediate compressible layer located substantially between the self-levelling foot and the workpiece. The resilient member may be a polymer, rubber, and may be provided to increase friction. Further the use of a resilient member may protect a decorative surface, a surface treatment, a coating or layer deposed on the workpiece.

It has been found that excessive tightening of the independently adjustable supports may lead to deformation of the workpiece and/or the first and/or second housings during the assembly of workpiece into the fabrication fixture, and further the warping of the workpiece during and after the bonding process. Thus the torque may be selected such that the workpiece is merely prevented from movement in the plane of the independently adjustable supports, rather than a high torque clamping action, preferably the optimal torque setting of the independently adjustable supports may be snug tight—defined as the force achievable by the effort of one man using a normal sized spanner without an extension arm.

If the workpiece is particularly light and/or has a high surface roughness and/or has a particular geometry the work piece may be retained in all degrees of freedom only by the independently adjustable supports acting on the periphery of the workpiece. However, when the workpiece is greater than 50 Kg, more preferably 100 Kg, there may be an end stop, preferably one or more end stops to retain the workpiece within the first and second housing, so as to allow the workpiece to be moved. Therefore workpieces which are heavier and/or have a smooth surface and/or have a substantially planar form which may not be readily retained in all degrees of freedom during movement by only independently adjustable supports may be retained by one or more end stops in those degrees of freedom, in addition to independently adjustable supports.

It may be therefore necessary to retain the workpiece by means of an end stop if the independently adjustable supports are unable to prevent movement in all degrees of freedom during movement of the fabrication fixture. Said end stops are either permanent or temporary features fastened or bonded to the first and/or second housing which are anchored and thereby acts against the periphery of the workpiece to prevent out of plane movement in any degree of freedom. The end stops may be made of any suitable material, such as for example, metal, polymers, plastic or wood. The end stops may be of any cross section, in any form be it box section, flat or geometrically contoured to the workpiece periphery. In a highly preferable arrangement said end stops are made from steel welded to a first or second housing.

A heavy workpiece, greater than 50 Kg may require end stops able to bear the full weight of the workpiece when the load path is acting wholly on the end stop, such as when the workpiece is rotated from a flat position to a near vertical position. A workpiece which is elongate and/or possesses a geometry such that clamping by the independently adjustable supports cannot retain the workpiece in all degrees of freedom may be aided by a plurality of end stops which act against the workpiece in such a way as to eliminate movement in all degrees of freedom.

In particular, a workpiece possessing a large surface area which is elongate will bow under its own weight due to a lack of flexural and axial stiffness and may be supported by a plurality of independently adjustable supports distributed across the surface area of the workpiece. Where there is not enough surface area on a side of the workpiece for the independently adjustable support to abut the workpiece when rotated from a flat position to a near vertical position, an end stop may be used which abuts the side of the workpiece thereby eliminating movement in a lateral plane. A corner end stop may be used which abuts two sides of the workpiece thereby eliminating movement in two lateral planes. Whilst end stops may require welding to the first or second housing, there are substantially fewer end stops than independently adjustable supports in contact with the workpiece.

In order to manoeuvre the fabrication jig, the first and/or second housing may comprise a plurality of lifting mounts. Said lifting mounts may take the form of lifting lugs, eyes or lashing points in any arrangement on the outer surface of the first and/or second housing. This allows the first and/or second housing to be lifted using a suitable arrangement of lifting apparatus, such as, for example chains, ropes, harnesses, spreader bars to lift the first and second housing as a unitary body, i.e. the fabrication fixture encompassing the workpiece. As an example, this may permit the movement of the fabrication fixture using a gantry crane from one side of a factory to another, or to allow the fabrication fixture to be rotated, flipped or transposed by pivoting or creating a moment about one end of the first and/or second housing.

The lifting mounts may be a permanent or temporary featured joined to the first and/or second housing. In a preferable arrangement, lifting eyes with threaded bolts are temporarily attached to the first and/or second housing on a flat outer surface for lifting the fabrication fixture from the ground and on the sides of the first and/or second housing to allow the fabrication fixture to be rotated, flipped or transposed.

According to a second aspect of the present invention, there is provided a method of retaining a workpiece between a first and second housing using a plurality of independently adjustable supports and rotating said fixture about an axis such that the first and second housing and workpiece are transposed.

The fabrication fixture may further comprise advanced locating features, which may include magnetism or laser outline projection to aid positioning of the workpiece.

Fabrication fixtures may also be used to transport or transpose a fragile workpiece from one location to another. This may be achieved by having a wheeled fixture, a sliding skid or suitable lifting points to allow the fixture to be moved.

The fabrication fixture may also be useful for partially transposing a workpiece into different orientations to perform an operation; the fixture having mechanical joints to enable transposition in one or more degrees of freedom and where it would be inappropriate to remove a partially fabricated structure from a fixture during a manufacturing operation. For example, rotating a partially welded tubular pipe about an axis within a fabrication fixture to continue the weld on either a quarter turn or on the opposite side. This may be useful where the pipe is unable to support its weight when removed from the fixture in a partially welded state.

In another example, a bulkhead for a ship, boat, air or land vehicle may be fabricated from a plurality of near planar substrates. Said substrates are aligned on a flat surface whereupon welds are made on one side only. To complete the weld, the substrates must be flipped such that welds can be made on the opposite side. In a partially welded state, the bulkhead is particularly prone to shear stress failure at the partial weld seam due to moments exerted by the individual substrates during the flipping/rotation, the weight of the substrates acting upon the partial weld and the lack of flexural and axial stiffness of the substrates.

According to a further aspect of the invention there is provided a fabrication fixture suitable for retaining a workpiece comprising a first housing comprising a plurality of reversibly connected modular sub sections, a second housing comprising a plurality of reversibly connected modular sub sections, wherein each of said first and second housing comprise a plurality of independently adjustable supports wherein the first and second housing at least in part envelop said workpiece such that the independent adjustable supports retain the workpiece within the first and second housing, so as to allow the retained workpiece to be moved.

The modular subsections of the fabrication fixture may be capable of receiving at least one independently adjustable support.

The use of modular subsections allow the fabrication fixture to be assembled to the desired size depending on the size of the workpiece.

According to a further aspect of the invention there is provided a method of transposing, flipping and/or rotating a workpiece comprising the steps of;
the use of a fabrication fixture as defined herein;
further comprising the steps of;
a) retaining a workpiece between the first and second housing using a plurality of independently adjustable supports;
b) rotating said fabrication fixture about an axis such that the first and second housing, and workpiece are transposed.

Preferably the step a) comprises;
the workpiece comprising two or more substrates to be bonded together, to form said workpiece;
wherein said substrates have a first side and a second side, the second side of the substrate substantially in contact with the independently adjustable supports connected to the housing;
c) adjusting said independently adjustable supports of the second housing to adopt to the contours of the second side of the two or more substrate;
d) bonding the two or more substrates from first side of the two or more substrates to create a partially bonded workpiece;
e) bringing the first housing into locking engagement with the first and second housing;
f) adjusting independently adjustable supports of the first to adopt the contours of the first side of the partially bonded workpiece;

g) providing at least one end stop to prevent movement in at least one plane.

In a preferable method step, said independently adjustable supports of the first and/or second housing will need to be adjusted to the correct extent to fit the periphery of a workpiece before said workpiece is retained by the first and second housing whereupon the independently adjustable supports are adjusted to a hand tight torque after the first and second housing are brought into locked engagement.

In a preferable method step, the fabrication fixture comprising the first and second housing and workpiece are transposed, flipped and/or rotated using a mounting point or mounting points by a linkage such as a cable, chain or rope such that exerting a force on said linkage either manually through a pulley system or mechanically by means such as a gantry crane, a turning moment acts upon the fabrication jig whereupon the fabrication jig is flipped such that the first and second housing and workpiece are rotated 180 degrees relative to their position before jig was flipped.

i) whereupon the first housing is disengaged and removed from the second housing;

j) whereupon the partially bonded workpiece is bonded on the second side of the two or more substrates to create a fully bonded workpiece.

Several arrangements of the invention will now be described by way of example and with reference to the accompanying drawings of which;—

Figure 1A:
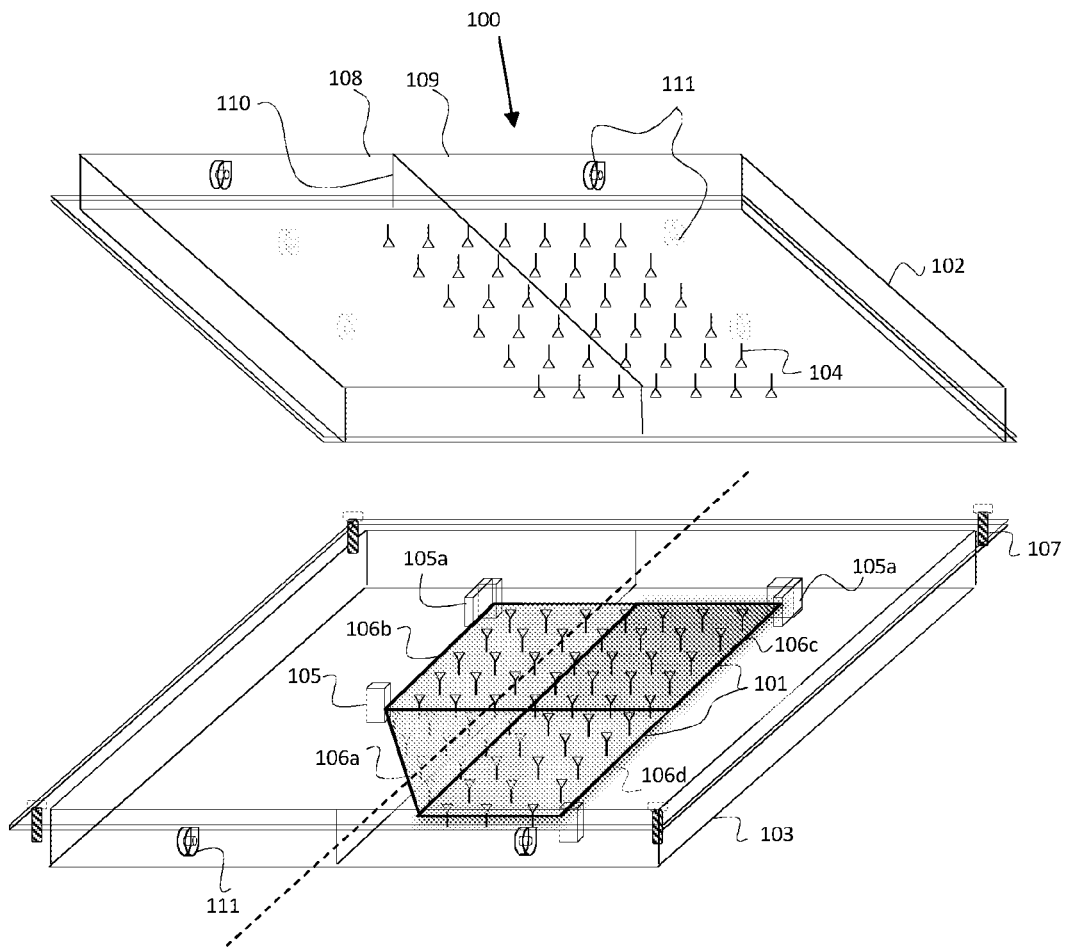
FIG. 1a shows a planar workpiece retained by a first housing.
Figure 1B:
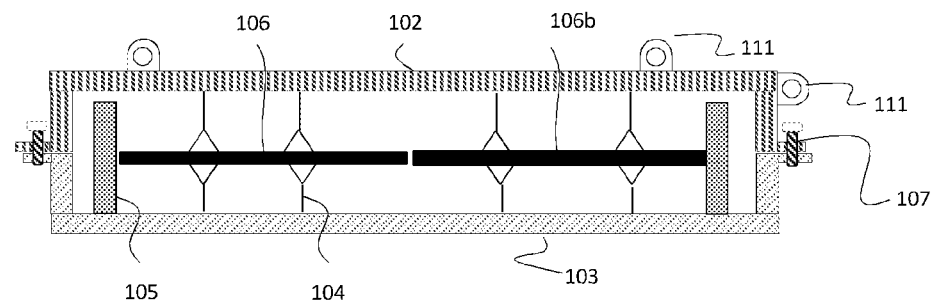
FIG. 1b shows a side view of 1a with a first housing in temporary locked arrangement with a second housing.

Turning to FIGS. 1a and 1b, there is provided a fabrication fixture 100 for retaining a workpiece 101 comprising; a first housing 102; a second housing 103; wherein each of said first and/or second housing comprises; a plurality of independently adjustable supports 104; an end stop 105 and corner stops 105a wherein the first housing 102 and second housing 103 are open box 'sandpit' like structures enveloping the workpiece 101. The workpiece 101 comprises a four planar metallic plates 106a, 106b, 106c, 106d to be welded at their respective edges on both sides to create one large planar metallic plate 101.

Said first housing 102 and second housing 103 are held in locked engagement by a reversible connection 107 which comprises a bolted connection at defined intervals around the perimeter of the first and second housing 102, 103.

The housing may be reinforced by members (not shown) to prevent unwanted deformation during movement. Said members may comprise strengthening beams spanning the inner and/or outer surface of the housing or machined pockets to create a lattice structure or a cantilever frame network which reinforces the housing.

It may be useful for the first housing 102 and second housing 103 to be made up of a plurality of modular sub-sections 108, 109, for reasons of ease of storage and/or assembly or to have a customisable housing adaptable to different shapes and sizes of workpieces; said modular sub-sections 108, 109 may be locked together and joined together 110, by a reversible connection (not shown) in similar arrangements to that of the first and second housing.

In order to adequately retain the workpiece 101 substantially between the first and second housings 102, 103, there is a plurality of independently adjustable supports 104 on both the first and second housings. In the present arrangement, said independently adjustable supports 104 protrude in the axis which is normal from the surface of the first and/or second housing 102, 103 to the workpiece 101 in order to substantially eliminate movement in one or more degrees of freedom.

It may be necessary to retain the piece by means of one or more end stops 105 if the independently adjustable supports 104 are unable to prevent movement in all degrees of freedom during movement of the fabrication fixture. Said end stops 105 are temporary features welded to a first and/or second housing 102, 103 which acts against the periphery of the workpiece 101 to prevent out of plane movement in any degree of freedom. In the present arrangements, said end stops 105 are made of steel angle bar. They may be located on the side of the work piece, to prevent movement in one direction or may be location on the corners 105a, to prevent movement in two planes of movement.

In order to manoeuvre the fabrication jig, the first and/or second housing 102, 103 may comprise a plurality of lifting eyes 111. The lifting eyes 111 are temporarily attached to the first and/or second housing 102,103 on a flat outer surface, to allow for lifting the fabrication jig 100 from the ground, and further lifting eyes 111 are on the sides of the first and/or second housing 102,103 to allow the fabrication jig to be rotated, flipped or transposed.

Figure 1C:
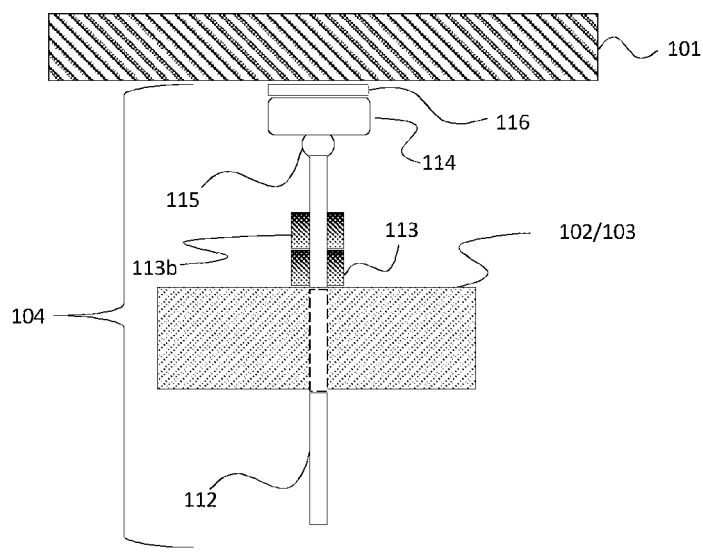
FIG. 1c shows an independently adjustable support in temporary connection with a housing.

Turning to FIG. 1c, shows the independently adjustable support 104 is in temporary connection with the first or second housing 102, 103 by way of a threaded bolt 112 extending through the first or second housing 102,103 retained by a captive nut 113 bonded to said housing and locked off by a second nut 113b. The independently adjustable support comprises a self-levelling foot 114 located substantially on the end of the independently adjustable support 104; said self-levelling foot able to adapt to the contours of the workpiece 101. The self-levelling foot 114 comprises a ball and socket joint 115 to allow the self-levelling foot to move in one or more degrees of freedom to conform to the workpiece 101 surface. The foot may have a resilient member 116 or layer deposed on the foot, such as, for example an intermediate compressible layer located substantially between the self-levelling foot and the workpiece. In the present arrangement, the resilient member 116 is a rubber pad.

Figure 2A:
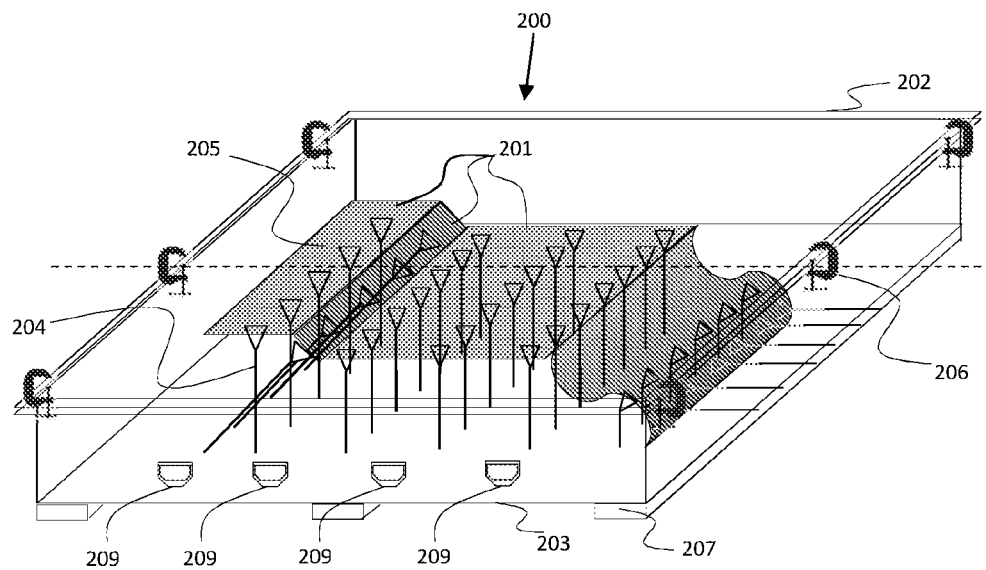
FIG. 2a shows a substantially geometric workpiece retained by a first and second housing.
Figure 2B:
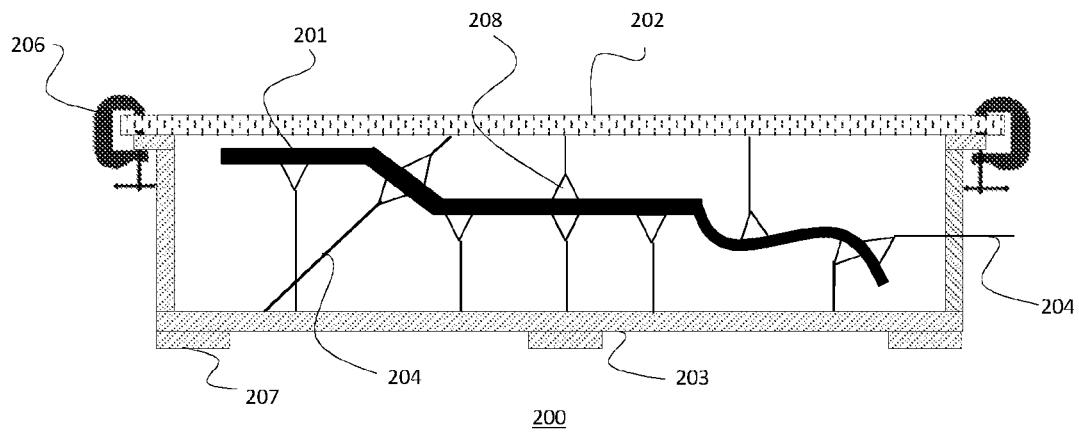
FIG. 2b shows a side view of 2a with a first housing in temporary locked arrangement connection with a second housing.

Turning to FIGS. 2a and 2b, there is provided a fabrication fixture 200 for retaining a workpiece 201 comprising; a first housing 202; a second housing 203; wherein each of said first and/or second housing comprises; a plurality of independently adjustable supports 204; wherein the first housing 202 and second housing 203 are open box 'sandpit' like structures enveloping the workpiece 201. Said the workpiece 201 comprises a plurality of geometric polymer panels 205 to be bonded at their respective edges on both sides to create a complex composite geometry workpiece 201.

Said first housing 202 and second housing 203 are held in locked engagement by a reversible connection 206 which comprises a clamping connection at defined intervals around the circumference of the first and second housing 202, 203.

The housing may be reinforced by members 207 to prevent unwanted deformation during movement. Said members may comprise strengthening beams spanning the inner and/or outer surface of the housing or machined pockets to create a lattice structure or a cantilever frame network which reinforces the housing.

In order to adequately retain the workpiece 201 substantially between the first and second housings 202, 203, there is a plurality of independently adjustable supports 204 on both the first and second housings. Said independently adjustable supports 204 protrude from the surface of the first and/or second housing 202, 203 at any angle or direction relative to the surface of the first said housings to the workpiece 201 in order to substantially eliminate movement in one or more degrees of freedom.

In the present arrangement, said independently adjustable supports 204 are in temporary connection with said housing 202, 203 by way of a telescopic pole permanently affixed to the first and/or second housings 202, 203. The independently adjustable support 204 comprises a self-levelling foot 208 located substantially on an end of the independently adjustable support 204; said self-levelling able to adapt to the contours of a workpiece 201. In the present arrangement, the self-levelling foot 208 is connected to the telescopic pole by a universal joint to allow the self-levelling foot to move in one or more degrees of freedom to conform to the workpiece 201 surface.

In the present arrangement, the workpiece 201 is retained solely by the independently adjustable supports 204.

In order to manoeuvre the fabrication jig, the first and/or second housing 202, 203 may comprise a plurality of lifting mount lugs 209. The lifting mount lugs 209 are permanently attached substantially to the perimeter edge of the second housing 203 for lifting the fabrication jig 200 from the ground and to allow the fabrication jig to be rotated, flipped or transposed.

Figure 3A:
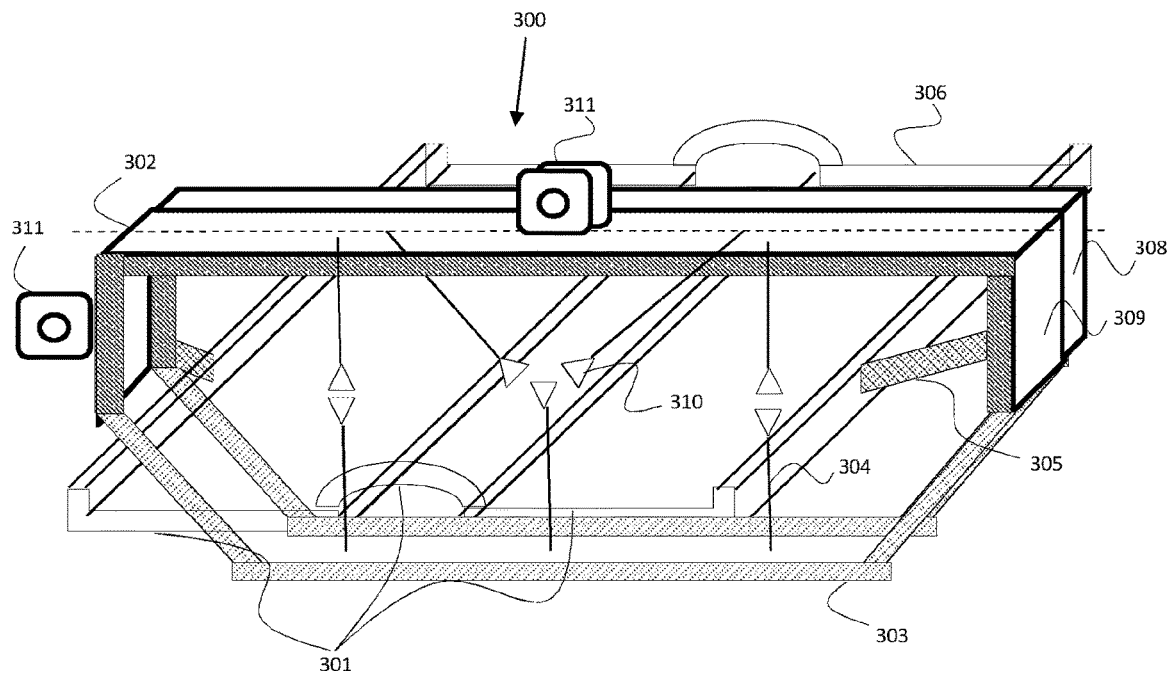
FIG. 3a shows an infinitely long workpiece retained by a first and second housing.
Figure 3B:
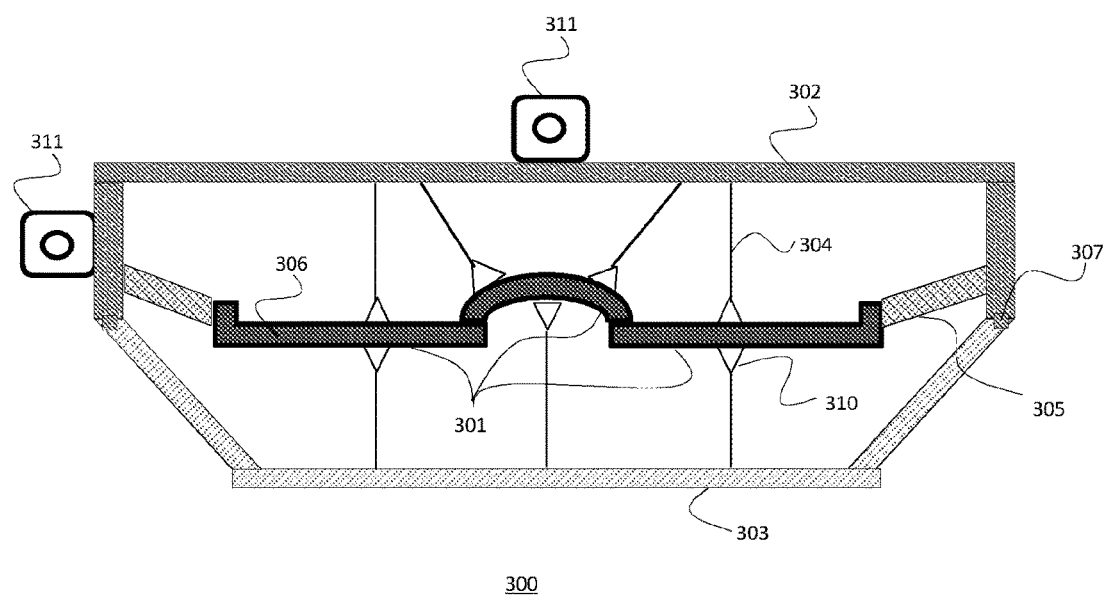
FIG. 3b shows a side view of 3a with a first housing in temporary locked arrangement with a second housing.

Turning to FIGS. 3a and 3b, there is provided a fabrication fixture 300 for retaining a workpiece 301 comprising; a first housing 302; a second housing 303; wherein each of said first and/or second housing comprises; an independently adjustable support 304; an end stop 305 wherein the first housing 302 and second housing 303 are open ended structures which wraparound said workpiece 301. In the present arrangement, said workpiece comprises a plurality of planar and geometric substrates 306 of infinite length to be bonded at their respective edges on both sides to create a complex composite geometry workpiece 301.

Said first housing 302 and second housing 303 are held in locked engagement by a reversible connection 307 which comprises a self-locating connection along the length of the first and second housing 302, 303.

It may be useful for the first housing 302 and second housing 303 to be made up of a plurality of modular sub-sections 308, 309, for reasons of ease of storage and/or assembly or to have a customisable housing adaptable to different shapes and sizes of workpieces; said modular sub-sections 308, 309 may be locked together by a reversible connection in similar arrangements to that of the first and second housing in FIGS. 1a 1b.

In order to adequately retain the workpiece 301 substantially between the first and second housings 302, 303, there is a plurality of independently adjustable supports 304 on both the first and second housings. Said independently adjustable supports 304 protrude from the surface of the first and/or second housing 302, 303 at any angle or direction relative to the surface of the first said housings to the workpiece 301 in order to substantially eliminate movement in one or more degrees of freedom.

The independently adjustable supports 304 comprise an elongated pole permanently affixed to the first and/or second housings 302, 303. The independently adjustable support 304 comprises a self-levelling foot 310 located substantially on an end of the independently adjustable support 304; said self-levelling foot able to adapt to the contours of a workpiece 301. In the present arrangement, the self-levelling foot 310 is connected to the elongated pole by a universal joint to allow the self-levelling foot to move in one or more degrees of freedom to conform to the workpiece 301 surface.

It may be necessary to retain the piece by one or more end stops 305 if the independently adjustable supports 304 are unable to prevent movement in all degrees of freedom during movement of the fabrication fixture. Said end stops are temporary features welded to a first or second housing 302, 303 which acts against the periphery of the workpiece 301 to prevent out of plane movement in any degree of freedom. In the present arrangements, said end stops 305 are made of steel angle bar welded to the first housing only.

In order to manoeuvre the fabrication jig, the first and/or second housing 302, 303 may comprise a plurality of lifting mount lugs 311. The lifting mount lugs are permanently attached substantially to the top and side surfaces of the second housing 303 for lifting the fabrication jig 300 from the ground and to allow the fabrication jig to be rotated, flipped or transposed.

Although a few preferred arrangements have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing arrangement(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A fabrication fixture suitable for retaining a workpiece, the fabrication fixture comprising:
   a first housing comprising a plurality of reversibly connected modular subsections and a plurality of independently adjustable supports; and a second housing comprising a plurality of reversibly connected modular subsections and a plurality of independently adjustable supports;

wherein the first and second housings in use at least in part envelop said workpiece such that the plurality of independently adjustable supports retain the workpiece within a volume defined between the first and second housings, wherein at least one of the first housing and the second housing is configured as an open-top box having a base panel and sidewalls extending away from the base panel;

wherein the first housing and/or the second housing comprises a plurality of end stops on the base panel, the plurality of end stops configured and arranged to abut to the workpiece to prevent workpiece movement along at least two axes.

2. The fabrication fixture of claim 1, wherein each of said reversibly connected modular subsections includes at least one of the plurality of independently adjustable supports.

3. The fabrication fixture of claim 1, wherein the first and second housings are configured for locking engagement with each other by way of a reversible connector.

4. The fabrication fixture of claim 1, wherein each of the plurality of independently adjustable supports protrudes toward the workpiece from a respective one of the first housing or second housing.

5. The fabrication fixture of claim 4, wherein individual independently adjustable supports of the plurality of independently adjustable supports comprise an adjustable shaft connected to a self-levelling foot.

6. The fabrication fixture of claim 1, comprising at least one lifting mount attached to the second housing and configured to enable lifting the fabrication fixture.

7. The fabrication fixture according to claim 1, wherein the first and second housings in use envelop said workpiece.

8. The fabrication fixture according to claim 1, wherein the first housing and/or the second housing is reinforced by members selected from one or more of (i) beams spanning a surface of the housing, (ii) a lattice structure, and (iii) a cantilever frame network.

9. A method of moving a workpiece, the method comprising:

providing a workpiece comprising two or more substrates to be bonded together, each of the two or more substrates having a first side and a second side;

providing a fabrication fixture including a first housing and a second housing, each of the first and second housings including a plurality of reversibly connected modular subsections and a plurality of independently adjustable supports;

arranging the second side of each of the two or more substrates to contact the plurality of independently adjustable supports of the second housing;

adjusting the plurality of independently adjustable supports of the second housing to adapt to respective contours of the second side of each of the two or more substrates;

bonding the two or more substrates from the first side of the two or more substrates to create a partially bonded workpiece;

bringing the first housing into locking engagement with the second housing;

adjusting one or more of the plurality of independently adjustable supports of the first housing to adapt to respective contours of the first side of the partially bonded workpiece, thereby the retaining the workpiece between the first and second housings using at least some of the plurality of independently adjustable supports of the first housing and/or of the second housing; and rotating said fabrication fixture about an axis such that the first and second housings and workpiece are transposed.

10. The method of claim 9, wherein providing the fabrication fixture includes providing the first housing disengaged and removed from the second housing.

11. The method of claim 9, further comprising bonding the partially bonded workpiece on the second side of each of the two or more substrates to create a fully bonded workpiece.

12. A fabrication fixture suitable for retaining a workpiece, the fabrication fixture comprising:

a first housing comprising a plurality of reversibly connected modular subsections and a plurality of independently adjustable supports, each independently adjustable support protruding from a surface of one of the reversibly connected modular subsections;

a second housing comprising a plurality of reversibly connected modular subsections and a plurality of independently adjustable supports, each independently adjustable support protruding from a surface of one of the reversibly connected modular subsections; and an end stop on one or both of the first housing and the second housing, the end stop configured to retain the workpiece within a space between the first and second housings when the first housing is assembled with the second housing;

wherein the first and second housings are configured to engage each other by way of a reversible connector and configured to at least in part envelop said workpiece such that at least some of the plurality of independently adjustable supports retain the workpiece within the space between the first and second housings; and wherein at least one of the first housing and the second housing is configured as an open-top box having a base panel and sidewalls extending away from the base panel.

13. The fabrication fixture of claim 12, wherein the end stop is a first end stop, the fabrication fixture comprising a second end stop, wherein the first end stop and the second end stop are configured and arranged to prevent workpiece movement along at least two axes.

14. The fabrication fixture of claim 12, wherein the independently adjustable supports comprise an adjustable shaft and a self-levelling foot.

15. The fabrication fixture of claim 12, comprising a corner stop configured and arranged to abut two sides of the workpiece and to inhibit workpiece movement along at least two perpendicular axes.

16. The fabrication fixture of claim 12, comprising a lifting mount attached to the fabrication fixture and configured to enable lifting the fabrication fixture when the first housing is assembled with the second housing.

* * * * *